(12) United States Patent
Zhu (10) Patent No.: US 12,540,626 B2
(45) Date of Patent: Feb. 3, 2026

(54) PORTABLE FAN WITH PREDICTABLE BATTERY LIFE AND METHOD FOR PREDICTING BATTERY LIFE THEREOF

(71) Applicant: Shenzhen Weiteshijia Technology Co., Ltd, Shenzhen (CN)

(72) Inventor: Caixia Zhu, Shenzhen (CN)

(73) Assignee: Shenzhen Weiteshijia Technology Co., Ltd, Shenzhen (CN)

( * ) Notice: Subject to any disclaimer, the term of this patent is extended or adjusted under 35 U.S.C. 154(b) by 0 days.

(21) Appl. No.: 19/276,301

(22) Filed: Jul. 22, 2025

(65) Prior Publication Data
US 2025/0347284 A1    Nov. 13, 2025

(30) Foreign Application Priority Data
Jun. 18, 2025    (CN) .......................... 202510815240.5

(51) Int. Cl.
*F04D 25/08*    (2006.01)
*H02J 7/00*    (2006.01)

(52) U.S. Cl.
CPC .......... *F04D 25/084* (2013.01); *H02J 7/0049* (2020.01); *H02J 2207/30* (2020.01)

(58) Field of Classification Search
CPC ...... F04D 25/084; F04D 25/08; H02J 7/0049; H02J 2207/30
See application file for complete search history.

(56) References Cited

U.S. PATENT DOCUMENTS

| | | | | |
|---|---|---|---|---|
| 5,160,880 | A * | 11/1992 | Palanisamy | H02J 7/007182 320/DIG. 12 |
| 12,110,908 | B1* | 10/2024 | Karavich | F04D 27/008 |
| 2012/0275940 | A1 | 11/2012 | Wark et al. | |
| 2014/0205479 | A1 | 7/2014 | Wark | |
| 2021/0381526 | A1 | 12/2021 | Weinmeister et al. | |
| 2022/0225694 | A1* | 7/2022 | Katsuta | A41D 13/0025 |
| 2025/0257740 | A1* | 8/2025 | He | F04D 25/08 |

* cited by examiner

*Primary Examiner* — Bryan M Lettman
(74) *Attorney, Agent, or Firm* — Zhigang Ma (57) ABSTRACT

A portable fan with predictable battery life and a method for predicting battery life thereof. The portable fan includes a fan body, where a circuit board assembly and a storage battery are installed in a shell of the fan body, a microprocessor and a current collector are encapsulated in the circuit board assembly, a load and a display device are provided on the fan body, and the display device includes a function lighting display area and a battery life display area. According to the portable fan, the display device can be used to indicate a working mode that the fan body is currently turned on and the working battery life that the storage battery can provide under the corresponding working mode. An intuitive and standard time unit is used for indication, so that a clear visual perception effect is achieved.

10 Claims, 7 Drawing Sheets

PORTABLE FAN WITH PREDICTABLE BATTERY LIFE AND METHOD FOR PREDICTING BATTERY LIFE THEREOF

TECHNICAL FIELD

The present disclosure relates to the technical field of fans, and in particular to a portable fan with predictable battery life and a method for predicting battery life thereof.

BACKGROUND

A fan is a common household appliance in our daily life, which is used to cool the air in hot weather. Because of the practical function, the fan is widely used, and therefore, has a strong market demand.

A portable fan belongs to a type of fans, which has the characteristics that a storage battery is built in and it is convenient to carry around. However, in order to meet the demand of portable use, the size and the capacity of the built-in storage battery are limited to some extent, which often leads to the embarrassing phenomenon that the power often runs out when a user uses a portable fan when going out. Once this happens, the use demand cannot be met, and carrying the fan itself will also create a burden for the user. Some portable fans are provided with indicators to indicate the power. For example, four indicators are provided. It indicates that the power is full when all of the four indicators are lit. It indicates that only 25% of the power is left when only one of the indicators is lit. Alternatively, some fans are provided with display screens, through which the percentage of the remaining power of the storage battery can be seen. However, these indication methods all have obvious defects. First, it is impossible to estimate the corresponding service time according to the specific use mode, all of the indications are vague, and there is no reference basis at all. For example, the fan turns on a low-power load and turns on a high-power load, which have completely different service times. Second, it is impossible to indicate the battery life intuitively, and it is impossible for users to quickly judge the battery life according to the remaining power, because the battery life will be affected by many factors. Third, the indication of the remaining power is inaccurate. The storage battery is affected by various factors in the use process, and the environment is complex. There may be 75% of the remaining power at present, which may drop to 60% in an instant. Without a scientific calculation method, the remaining power cannot be accurately estimated.

It is under the above-mentioned factor that many users hesitate to take a fan when they go out, which will inevitably reduce the practicability of the portable fan and weaken the application and popularization effect of the portable fan. This is not conducive to the healthy and sustainable development of the industry. Changing this defect has become a technical problem that need to be solved urgently.

SUMMARY

An objective of the present disclosure is to provide a portable fan with predictable battery life and a method for predicting battery life thereof. A display device is provided on the fan body, which can be used to indicate a working mode that the fan body is currently turned on and the working battery life that the storage battery can provide under the corresponding working mode. An intuitive and standard time unit is used for indication, so that a clear visual perception effect is achieved. An accurate selection basis is provided for a user to decide whether to use or how to use the portable fan. Moreover, the method for predicting battery life is accurate and correctable, the user experience and practicability are improved, effective assistance is provided for the healthy and sustainable development of the portable fan industry, and the problems raised by the above background are solved.

In order to achieve the above objective, the present disclosure provides the following technical solution: a portable fan with predictable battery life, including a fan body, where the fan body includes a shell, and a circuit board assembly and a storage battery are installed in the shell, a microprocessor and a current collector are encapsulated in the circuit board assembly, a load and a display device are provided on the fan body, the load includes a drive fan blade group, the display device includes a function lighting display area and a battery life display area, and the storage battery, the load and the display device are all electrically connected with the circuit board assembly.

Preferably, the microprocessor is a Digital Signal Processor (DSP) or a Microcontroller (MCU).

Preferably, the current collector is a current sensor or a current collecting circuit.

Preferably, the function lighting display area and the battery life display area are provided in the same display area on the display device, and the function lighting display area and the battery life display area are capable of being alternately switched and displayed.

Preferably, the load includes a semiconductor refrigeration device, the semiconductor refrigeration device includes a cold and hot semiconductor, a conductor and a heat sink, a semiconductor installation through hole is provided in the shell, the semiconductor installation through hole penetrates through a wall surface of the shell, two opposite side wall surfaces of the cold and hot semiconductor are provided as a cooling working surface and a heating working surface, respectively, the cold and hot semiconductor is embedded in the semiconductor installation through hole, the cooling working surface is provided toward an outer side of the shell, the heating working surface is provided toward an inner side of the shell, the outer side of the cooling working surface is covered with the conductor, the conductor is in heat conduction connection with the cooling working surface, and the heating working surface is in heat conduction connection with the heat sink.

Preferably, both the conductor and the heat sink are aluminum alloy members.

Preferably, the circuit board assembly is electrically connected with a control button and a power input interface.

Preferably, the control button includes a power switch and a function mode switching button.

Preferably, the power input interface is a Type-C interface.

Preferably, a method for predicting battery life of a portable fan is as follows:

S1) initializing a battery capacity, turning on a load to work until the power of the storage battery runs out, where when the power of the storage battery is incapable of supporting to turn on the load with a minimum power consumption for operation independently, it is considered that the power has run out, and the microprocessor resets the total remaining current of the storage battery;

S2) connecting the power input interface with an external power supply by using a charging cable to charge the storage battery;

S3) collecting, by the current collector, current values flowing into the storage battery in a charging process, and integrating, by the microprocessor, the collected current values in time, where the integration process is expressed as the accumulation of the current values at discrete time points, that is, $\Sigma(I[n]\times\Delta t)$, where $I[n]$ denotes a current value at an n-th time, $\Delta t$ denotes a time interval, and the total remaining current is updated at the same time after each integration;

S4) turning on the load, collecting, by the current collector, current values flowing out of the storage battery in a working process of the load, subtracting, by the microprocessor, the collected current values in time, updating the total remaining current at the same time after each subtraction, and at the same time, calculating, by the microprocessor, current consumption of the load per unit time according to the collected subtracted total current value, calculating, by the microprocessor, the remaining battery life in the current load environment with a formula of "total remaining current÷current consumption per unit time", converting the remaining battery life into the time unit corresponding to the display device to be displayed to a user on the "battery life display area" of the display device, and at the same time, the "function lighting display area" on the display device displaying the current load situation;

S5) switching, by the control button, the type of the turned-on load, similarly to S4, displaying the turned-on load to a user through the "function lighting display area", and at the same time, the "battery life display area" on the display device displaying battery life in view of the current load situation to a user;

S6) in the use process, if there is obvious time difference in battery life, performing the above S1 operation again to initialize the battery capacity for correcting the consistency of the current hardware environment and ensuring the accuracy of battery life.

Preferably, the time unit of the battery life display area is in "seconds", or "minutes", or "hours" or "days".

Compared with the prior art, the present disclosure has the following beneficial effects.

According to the present disclosure, a display device is provided on the fan body, which can be used to indicate a working mode that the fan body is currently turned on and the working battery life that the storage battery can provide under the corresponding working mode. An intuitive and standard time unit is used for indication, so that a clear visual perception effect is achieved. An accurate selection basis is provided for a user to decide whether to use or how to use the portable fan. Moreover, the method for predicting battery life is accurate and correctable, the user experience and practicability are improved, and effective assistance is provided for the healthy and sustainable development of the portable fan industry.

In the figure: 1 Circuit board assembly; 11 Power switch; 12 Function mode switching button; 13 Type-C interface; 2 Storage battery; 3 Drive fan blade group; 4 Display device; 41 Function lighting display area; 42 Battery life display area; 5 Semiconductor refrigeration device; 51 Conductor; 52 Cold and hot semiconductors; 53 Semiconductor installation through hole; 54 Heat sink

DETAILED DESCRIPTION OF THE EMBODIMENTS

In the following, the technical solution in the embodiment of the present disclosure will be clearly and completely described with reference to the drawings. Obviously, the described embodiments are only some embodiments of the present disclosure, rather than all of the embodiments. Based on the embodiments in the present disclosure, all other embodiments obtained by those skilled in the art without paying creative labor belong to the scope of protection of the present disclosure.

Figure 1:
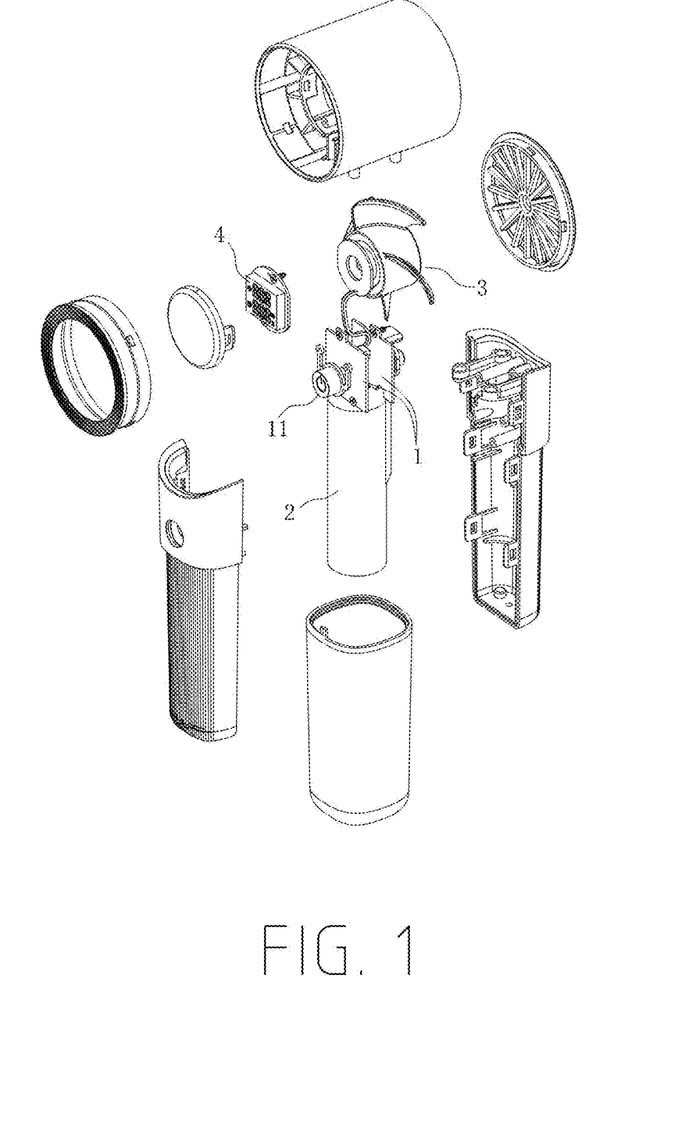
FIG. 1 is an exploded view of a structure according to the present disclosure.
Figure 2:
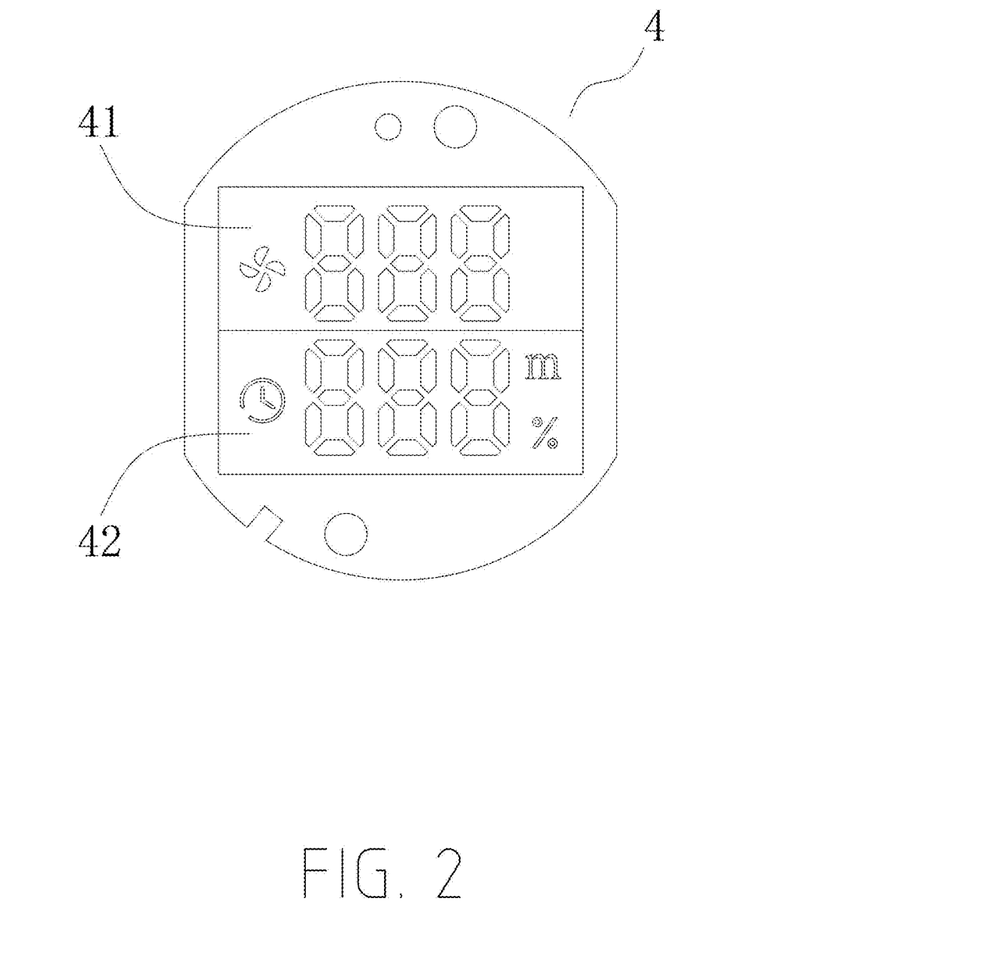
FIG. 2 is a schematic structural diagram of a display device according to the present disclosure.
Figure 7:
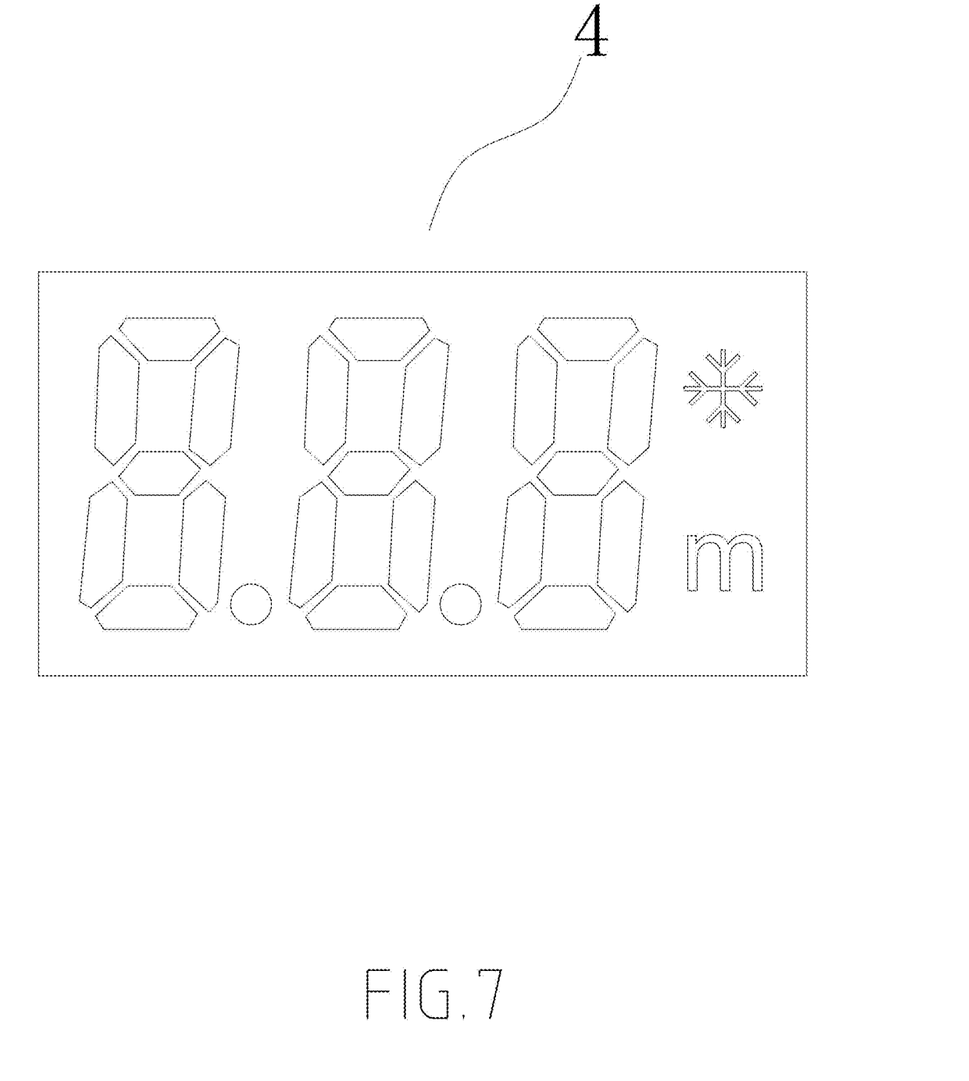
FIG. 7 is an example diagram in which a function lighting display area and a battery life display area are provided in the same display area of a display device according to the present disclosure.

Referring to FIG. 1 to FIG. 4, a portable fan with predictable battery life includes a fan body. The fan body includes a shell. A circuit board assembly 1 and a storage battery 2 are installed in the shell. A microprocessor and a current collector are encapsulated in the circuit board assembly 1. A load and a display device 4 are provided on the fan body. The load includes a drive fan blade group 3. The display device 4 includes a function lighting display area 41 and a battery life display area 42. The function lighting display area 41 and the battery life display area 42 can be provided on the display device 4 according to the areas, as shown in FIG. 2. Due to being restricted in the surface area of the shell, the function lighting display area and the battery life display area can also be provided in the same display area on the display device 4 in order to save the occupation of the surface area of the shell. As shown in FIG. 7, the function lighting display area 41 and the battery life display area 42 are alternately switched and displayed. The storage battery 2, the load and the display device 4 are all electrically connected with the circuit board assembly 1.

The microprocessor can be a Digital Signal Processor (DSP) or a Microcontroller (MCU).

The current collector can be a current sensor or a current collecting circuit.

Figure 5:
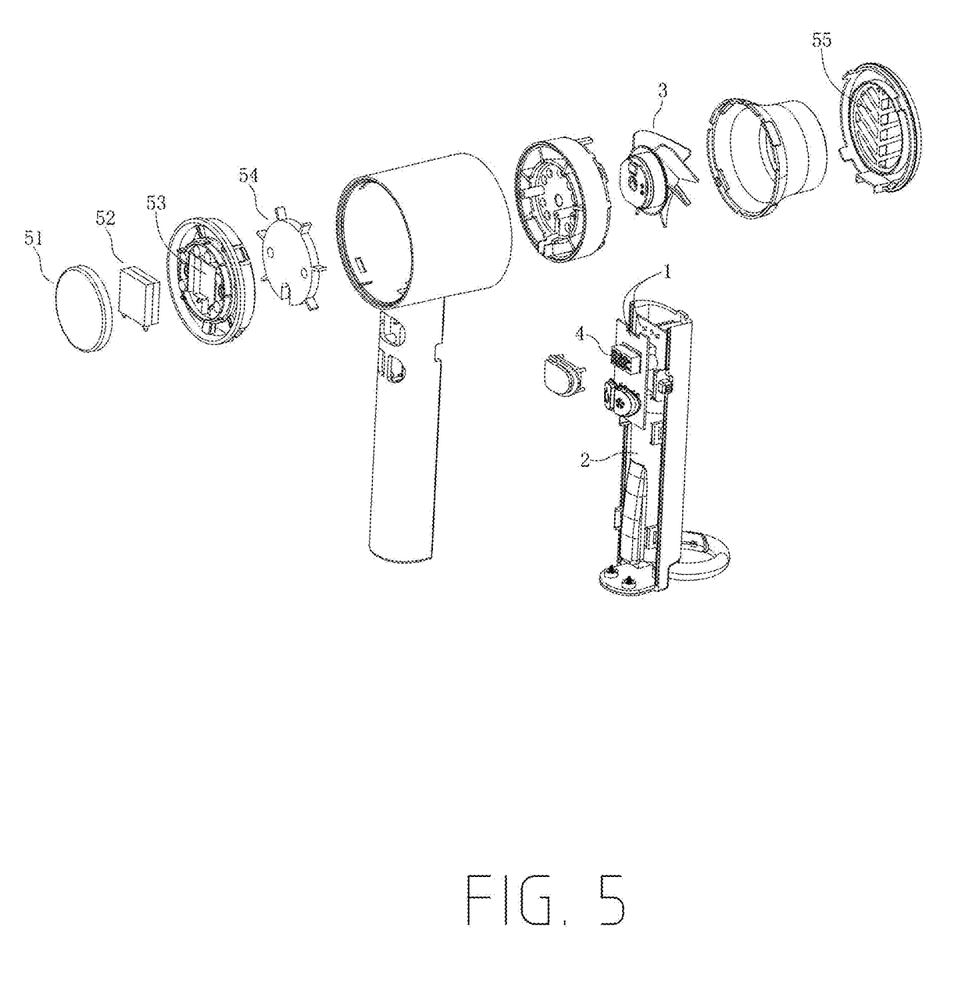
FIG. 5 is an exploded view of a structure of a semiconductor refrigeration device according to the present disclosure.
Figure 6:
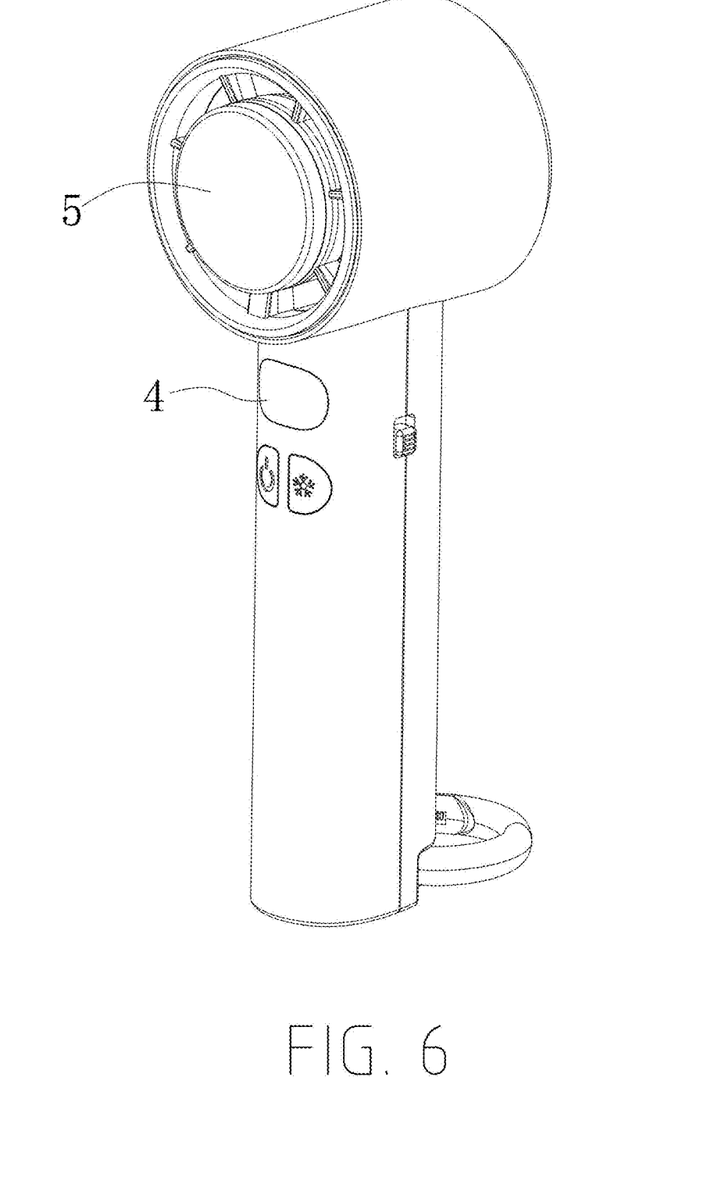
FIG. 6 is a three-dimensional view of an appearance of a loaded semiconductor refrigeration device according to the present disclosure.

As shown in FIG. 5 and FIG. 6, the load on the fan body can be further provided with other loads besides the drive fan blade group 3, such as a semiconductor refrigeration device 5. The semiconductor refrigeration device 5 includes a cold and hot semiconductor 52, a conductor 51 and a heat sink 54. A semiconductor installation through hole 53 is provided in the shell. The semiconductor installation through hole 53 penetrates through a wall surface of the shell. Two opposite side wall surfaces of the cold and hot semiconductor 52 are provided as a cooling working surface and a heating working surface, respectively. The cold and hot semiconductor 52 is embedded in the semiconductor installation through hole 53. The cooling working surface is provided toward an outer side of the shell. The heating working surface is provided toward an inner side of the shell. The outer side of the cooling working surface is covered with the conductor 51. The conductor 51 is in heat conduction connection with the cooling working surface, and the heating working surface is in heat conduction connection with the heat sink 54. Both the conductor 51 and the heat sink 54 are aluminum alloy members. When the cold and hot semiconductor works, the refrigeration effect generated by the refrigeration working surface can be conducted to the conductor 51. When the conductor 51 acts on the human body, the nursing effect of local cold compress can be achieved for the human body. The heat generated by the heating working surface is dissipated through the heat sink 54. The heat sink 54 is provided in an air passage of the drive fan blade group 3. The heat emitted by the heat sink 54 can be blown out by the airflow in the air passage.

Figure 3:
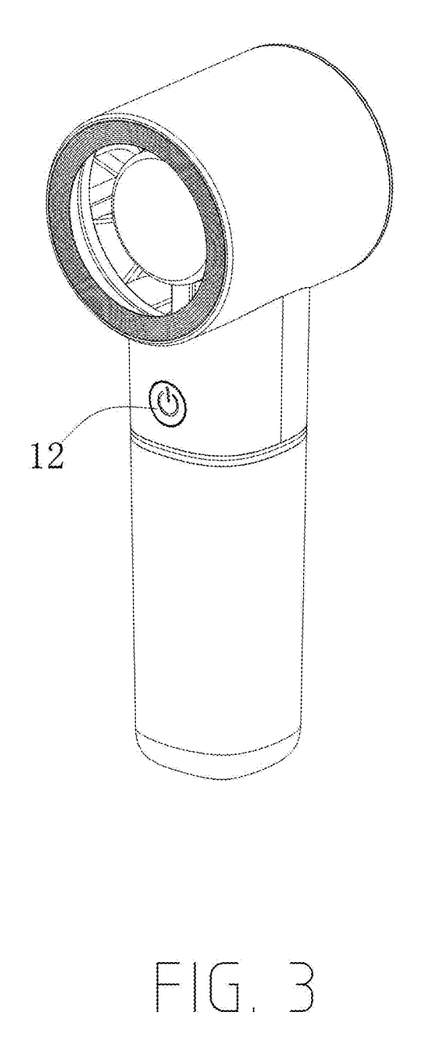
FIG. 3 is a first three-dimensional view of an appearance according to the present disclosure.
Figure 4:
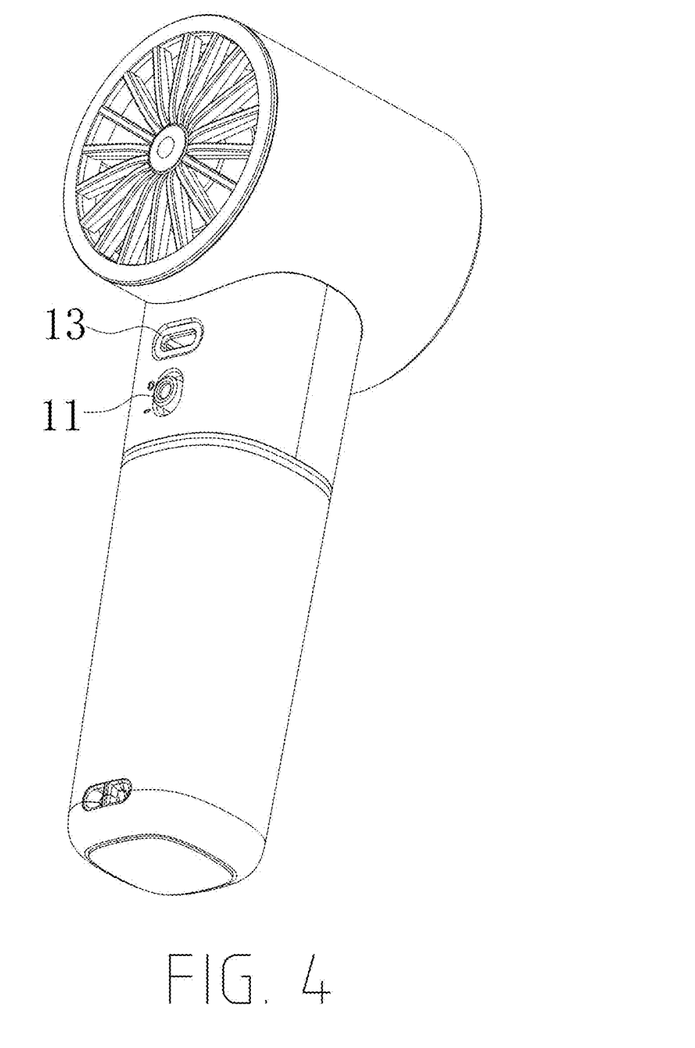
FIG. 4 is a second three-dimensional view of an appearance according to the present disclosure.

The circuit board assembly 1 is electrically connected with a control button and a power input interface. The control button includes a power switch 11 and a function mode switching button 12. The power switch 11 is configured to control the circuit connection state of the fan body. When the power switch 11 is turned off, all loads stop working, so that the loss of power can be effectively reduced. The function mode switching button 12 is configured to adjust the working state and the working mode of switching loads. The power input interface is a Type-C interface 13. The external power supply is connected with the Type-C interface 13 by using a charging cable, so that the storage battery 2 can be charged to replenish the power.

A method for predicting battery life of a portable fan with predictable battery life includes the following steps.

S1) a battery capacity is initialized. A load is turned on to work until the power of the storage battery runs out. When the power of the storage battery is incapable of supporting to turn on the load with a minimum power consumption for operation independently, it is considered that the power has run out, and the microprocessor resets the total remaining current of the storage battery.

S2) the power input interface is connected with an external power supply by using a charging cable to charge the storage battery.

S3) the current collector collects current values flowing into the storage battery in a charging process. The microprocessor integrates the collected current values in time. The integration process is expressed as the accumulation of the current values at discrete time points, that is, $\Sigma(I[n] \times \Delta t)$, where $I[n]$ denotes a current value at an n-th time, $\Delta t$ denotes a time interval, and the total remaining current is updated at the same time after each integration.

S4) the load is turned on. The current collector collects current values flowing out of the storage battery in a working process of the load. The microprocessor subtracts the collected current values in time. The total remaining current is updated at the same time after each subtraction. At the same time, the microprocessor calculates current consumption of the load per unit time according to the collected subtracted total current value. The microprocessor calculates the remaining battery life in the current load environment with a formula of "total remaining current÷current consumption per unit time", and the remaining battery life is converted into the time unit corresponding to the display device to be displayed to a user on the "battery life display area" of the display device. At the same time, the "function lighting display area" on the display device displays the current load situation.

S5) the control button can switch the type of the turned-on load. Similarly to S4, the turned-on load is displayed to a user through the "function lighting display area". At the same time, the "battery life display area" on the display device displays battery life in view of the current load situation to a user.

S6) in the use process, if there is obvious time difference in battery life, the above S1 operation can be performed again to initialize the battery capacity for correcting the consistency of the current hardware environment and ensuring the accuracy of battery life.

The time unit of the battery life display area can be in "seconds", or "minutes", or "hours" or "days". The standard symbols s, m, h, T, and the like can be used as the time unit correspondingly.

To sum up, according to the present disclosure, a display device 4 is provided on the fan body, which can be used to indicate a working mode that the fan body is currently turned on and the working battery life that the storage battery 2 can provide under the corresponding working mode. An intuitive and standard time unit is used for indication, so that a clear visual perception effect is achieved. An accurate selection basis is provided for a user to decide whether to use or how to use the portable fan. Moreover, the method for predicting battery life is accurate and correctable, the user experience and practicability are improved, and effective assistance is provided for the healthy and sustainable development of the portable fan industry.

It should be noted that in the present disclosure, relational terms such as first and second are only used to distinguish one entity or operation from another entity or operation, and do not necessarily require or imply that there is any such actual relationship or order between these entities or operations. Moreover, the terms "including", "comprising" or any other variation thereof are intended to cover non-exclusive inclusion, so that a process, method, article or device including a series of elements includes not only those elements, but also other elements not explicitly listed or elements inherent to such process, method, article or device.

Although embodiments of the present disclosure have been shown and described, it will be understood by those skilled in the art that various changes, modifications, substitutions and variations can be made to these embodiments without departing from the principle and the spirit of the present disclosure. The scope of the present disclosure is defined by the appended claims and their equivalents.

What is claimed is:

1. A portable fan with predictable battery life, comprising a fan body, wherein the fan body comprises a shell, and a circuit board assembly (1) and a storage battery (2) are installed in the shell, wherein a microprocessor and a current collector are encapsulated in the circuit board assembly (1), a load and a display device (4) are provided on the fan body, the load comprises a drive fan blade group (3), the display device (4) comprises a function lighting display area (41) and a battery life display area (42), and the storage battery (2), the load and the display device (4) are all electrically connected with the circuit board assembly (1), wherein the load comprises a semiconductor refrigeration device (5), the semiconductor refrigeration device (5) comprises a cold and hot semiconductor (52), a conductor (51) and a heat sink (54), a semiconductor installation through hole (53) is provided in the shell and surrounded by an air inlet (55) of the fan, the semiconductor installation through hole (53) penetrates through a wall surface of the shell, two opposite side wall surfaces of the cold and hot semiconductor (52) are provided as a cooling working surface and a heating working surface, respectively, the cold and hot semiconductor (52) is embedded in the semiconductor installation through hole (53), the cooling working surface is provided toward an outer side of the shell, the heating working surface is provided toward an inner side of the shell, the outer side of the cooling working surface is covered with the conductor (51), the conductor (51) is in heat conduction connection with the cooling working surface, and the heating working surface is in heat conduction connection with the heat sink (54).

2. The portable fan with predictable battery life according to claim 1, wherein the microprocessor is a Digital Signal Processor (DSP) or a Microcontroller (MCU).

3. The portable fan with predictable battery life according to claim 1, wherein the current collector is a current sensor or a current collecting circuit.

4. The portable fan with predictable battery life according to claim 1, wherein the function lighting display area (41) and the battery life display area (42) are provided in the same display area on the display device (4), and the function lighting display area (41) and the battery life display area (42) are capable of being alternately switched and displayed.

5. The portable fan with predictable battery life according to claim 1, wherein both the conductor and the heat sink are aluminum alloy members.

6. The portable fan with predictable battery life according to claim 1, wherein the circuit board assembly (1) is electrically connected with a control button and a power input interface.

7. The portable fan with predictable battery life according to claim 6, wherein the control button comprises a power switch (11) and a function mode switching button (12).

8. The portable fan with predictable battery life according to claim 6, wherein the power input interface is a Type-C interface (13).

9. A portable fan with predictable battery life, comprising a fan body, wherein the fan body comprises a shell, and a circuit board assembly (1) and a storage battery (2) are installed in the shell, wherein a microprocessor and a current collector are encapsulated in the circuit board assembly (1), a load and a display device (4) are provided on the fan body, the load comprises a drive fan blade group (3), the display device (4) comprises a function lighting display area (41) and a battery life display area (42), and the storage battery (2), the load and the display device (4) are all electrically connected with the circuit board assembly (1), wherein a method for predicting battery life of a portable fan is as follows:

S1) initializing a battery capacity, turning on the load to work until the power of the storage battery runs out, wherein when the power of the storage battery is incapable of supporting to turn on the load with a minimum power consumption for operation independently, it is considered that the power has run out, and the microprocessor resets the total remaining current of the storage battery;

S2) connecting the power input interface with an external power supply by using a charging cable to charge the storage battery;

S3) collecting, by the current collector, current values flowing into the storage battery in a charging process, and integrating, by the microprocessor, the collected current values in time, wherein the integration process is expressed as the accumulation of the current values at discrete time points, that is, $\Sigma(I[n]\times\Delta t)$, where $I[n]$ denotes a current value at an n-th time, $\Delta t$ denotes a time interval, and the total remaining current is updated at the same time after each integration;

S4) turning on the load, collecting, by the current collector, current values flowing out of the storage battery in a working process of the load, subtracting, by the microprocessor, the collected current values in time, updating the total remaining current at the same time after each subtraction, and at the same time, calculating, by the microprocessor, current consumption of the load per unit time according to the collected subtracted total current value, calculating, by the microprocessor, the remaining battery life in the current load environment with a formula of "total remaining current÷current consumption per unit time", converting the remaining battery life into the time unit corresponding to the display device to be displayed to a user on the "battery life display area" of the display device, and at the same time, the "function lighting display area" on the display device displaying the current load situation;

S5) switching, by the control button, the type of the turned-on load, displaying the turned-on load to a user through the "function lighting display area", and at the same time, the "battery life display area" on the display device displaying battery life in view of the current load situation to a user;

S6) in the use process, if there is an obvious time difference in battery life, performing the above S1 operation again to initialize the battery capacity for correcting the consistency of the current hardware environment and ensuring the accuracy of battery life.

10. The portable fan with predictable battery life according to claim 9, wherein the time unit of the battery life display area is in "seconds", or "minutes", or "hours" or "days".

* * * * *